(12) United States Patent
Forrester

(10) Patent No.: US 6,396,031 B1
(45) Date of Patent: May 28, 2002

(54) MODULAR PROCESSING DEVICES AND METHODS OF USE

(75) Inventor: Robert Forrester, Addison, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 09/654,506

(22) Filed: Sep. 1, 2000

Related U.S. Application Data

(60) Provisional application No. 60/152,306, filed on Sep. 3, 1999.

(51) Int. Cl.[7] .............................. H05B 1/02; A23L 1/18
(52) U.S. Cl. ......................................... 219/494; 99/331
(58) Field of Search ................................. 219/476, 478, 219/494, 497, 506, 508, 518, 700, 701; 99/331, 333, 386, 378, 443 C

(56) References Cited

U.S. PATENT DOCUMENTS

| | | | |
|---|---|---|---|
| 4,245,613 A | * 1/1981 | Wells et al. | .............. 126/19 R |
| 4,610,886 A | * 9/1986 | Buller-Colthurst | .......... 426/233 |
| 4,664,923 A | * 5/1987 | Wagner et al. | ............... 426/233 |
| 4,701,340 A | * 10/1987 | Bratton et al. | ............... 426/511 |
| 5,179,265 A | * 1/1993 | Sheridan et al. | ............. 219/497 |
| 5,522,309 A | * 6/1996 | Mizobuchi et al. | ............ 99/334 |
| 5,688,423 A | 11/1997 | Rudewicz et al. | |
| 5,897,807 A | * 4/1999 | Edgar et al. | ................. 219/700 |
| 6,157,002 A | * 12/2000 | Schjerven, Sr. et al. | .... 219/494 |
| 6,157,014 A | * 12/2000 | Goranson | .................... 219/700 |

FOREIGN PATENT DOCUMENTS

| | | |
|---|---|---|
| EP | 0 680 697 A1 | 11/1995 |
| GB | 2 251 960 | 7/1992 |

* cited by examiner

*Primary Examiner*—Sang Paik
(74) *Attorney, Agent, or Firm*—Dicke, Billig & Czaja, P.A.

(57) ABSTRACT

A modular processing device and method of using the modular processing device are disclosed. The modular processing device has a plurality of processing modules removably mounted therein. The processing modules are operable alone or as a group to process an item that is placed in the modular processing device.

28 Claims, 3 Drawing Sheets

MODULAR PROCESSING DEVICES AND METHODS OF USE

RELATED APPLICATION

The present application claims the benefit of U.S. Provisional Application No. 60/152,306 filed Sep. 3, 1999, which is incorporated herein in its entirety by reference.

TECHNICAL FIELD

The present invention relates to a modular processing device and a method of use. More particularly, the present invention relates to a modular cooking device and a method of use.

BACKGROUND OF THE INVENTION

In various situations it is necessary to process objects of different sizes or composition. The nature of the objects often affects the conditions under which the items are processed. It is often desirable to process objects having different sizes or compositions simultaneously or sequentially.

For example, when cooking food items such as pizza, it is desirable to use a single oven to cook pizzas having a variety of sizes. It is also desirable to cook pizzas having a variety of dough configurations, such as thin crust, thick crust and stuffed, in a single oven. However, each pizza size and dough configuration requires individual cooking parameters to provide the cooked product with optimal characteristics.

In light of the foregoing, it is necessary for a person putting the pizza into the oven to enter the specific cooking parameters into the oven as each pizza is placed in the oven. It can be appreciated that errors can occur in such a process, and an operator can inadvertently enter the wrong parameters. When this happens the pizza emerges from the cooking process undercooked or overcooked thereby requiring the defectively cooked pizza to be discarded. Another pizza must then be prepared and cooked. Delays associated with these errors frequently lead to customer complaints because of the increased waiting time between ordering the pizza and being able to consume the pizza.

SUMMARY OF THE INVENTION

An embodiment of the present invention relates to a multi-technology oven for processing an item. The multi-technology oven has a plurality of processing modules mounted therein. The plurality of processing modules is removably mounted in the multi-technology oven. The individual modules are operable alone or as a group comprising more than one of the processing modules.

Another embodiment of the present invention relates to a method of processing items. The method includes providing a processing device having an entry port and an exit port. A plurality of processing modules is removably mounted in the processing device. The items are moved through the processing device from the entry port to the exit port. The operation of the plurality of processing modules is controlled at selected locations to affect processing of the items.

DETAILED DESCRIPTION OF PREFERRED EMBODIMENTS

Figure 1:
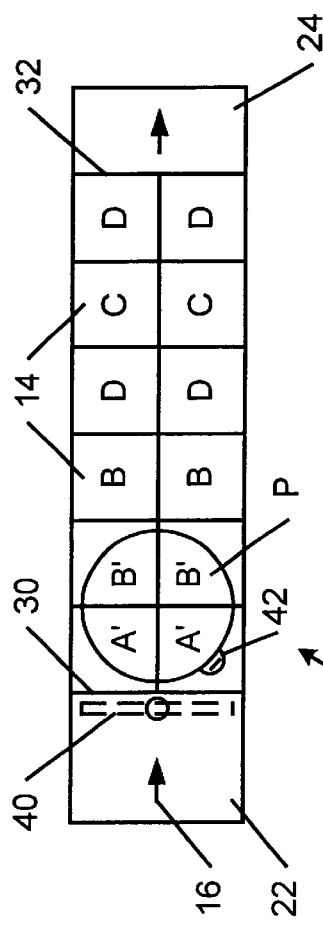
FIG. 1 is a top view of a modular oven or other environmental device according to an embodiment of the present invention.
Figure 2:
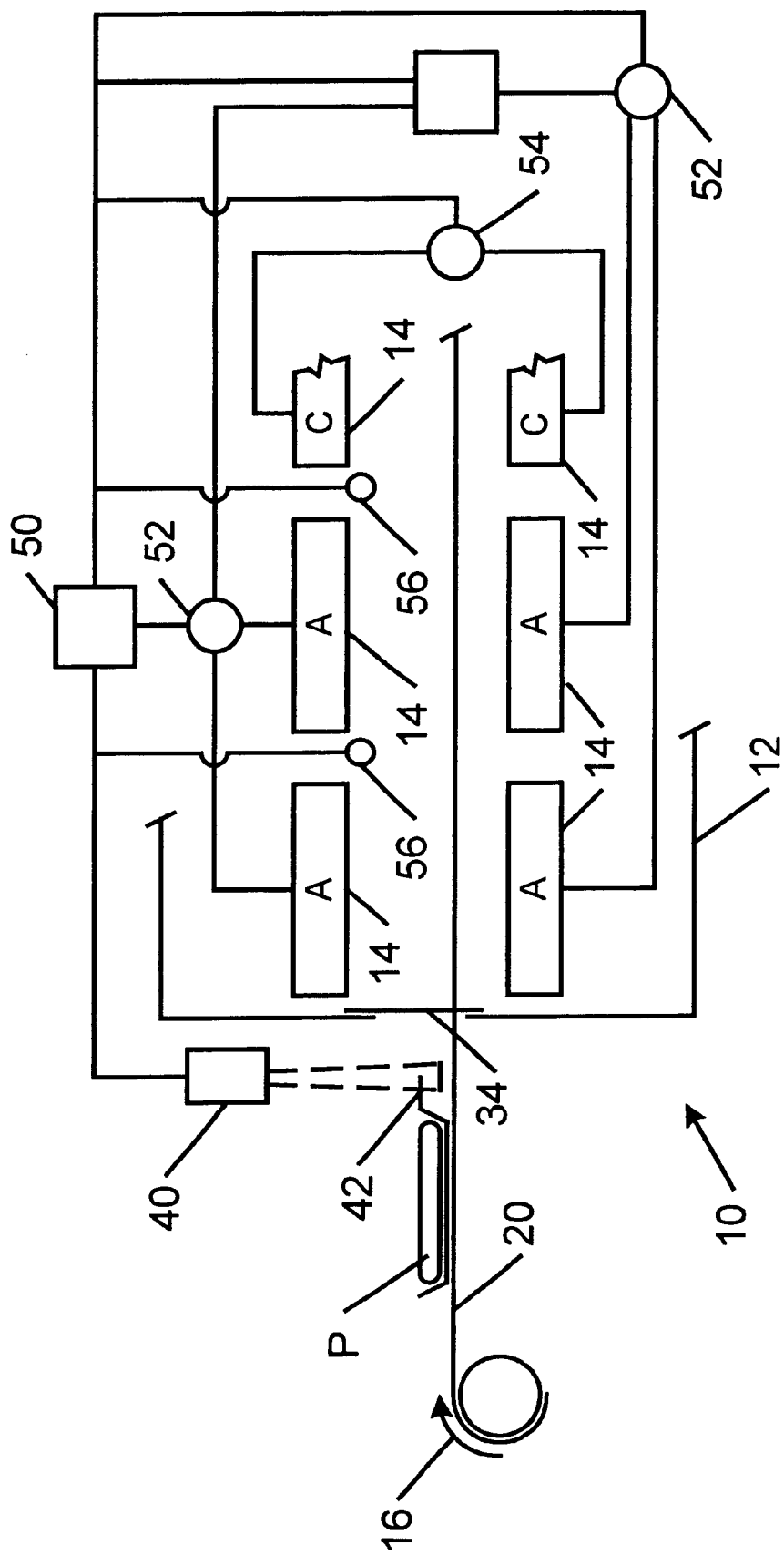
FIG. 2 is a schematic view of an oven or other environmental device illustrated in FIG. 1.

The present invention is directed to a modular processing device, as illustrated at 10 in FIGS. 1 and 2. The modular processing device 10 has an enclosure 12 in which is mounted a plurality of processing modules 14. The plurality of processing modules 14 is preferably arranged in an array.

The modular processing device 10 of the present invention thereby enables items P having varying characteristics to be processed under individualized conditions such that each type of item P exhibits optimal results from the processing. The processing modules 14 are individually controlled to enable the environment or custom condition created by the processing modules 14 to move with the items P as the items P move through the modular processing device 10. The modular processing device 10 also detects the type of item P being processed so that the modular processing device 10 can automatically adjust the processing conditions for the particular item P being processed.

Examples of processing modules 14 that are suitable for use with the modular processing device 10 of the present invention employ technologies such as air or gas impingement, heat or cold treatment, electronic dielectric heating, microwave, radio wave, ultrasonic wave, light wave, conductive heat, radiant heat, convective heat, cold plate and/or other heating and/or cooling technologies. The plurality of processing modules 14 is preferably used for thermally treating a food product P that is placed in the modular processing device 10.

The processing modules 14 preferably each have a size that is substantially similar so that the processing modules 14 will all fit in a given location. Alternatively, the processing modules 14 may be formed in a size that is equal to an integer times a base unit size. For example, two processing modules 14 of one type are the same size as one processing module 14 of another type.

The processing modules 14 are preferably removably mounted in the modular processing device 10 so that the processing modules 14 may be changed to further enhance the flexibility of the modular processing device 10 of the present invention. The processing modules 14 may preferably be swapped while the modular processing device 10 is at least partially activated. Such a procedure is typically referred to as a "hot swap." Alternatively, the modular processing device 10 is turned off or deactivated prior to changing the processing modules 14.

The processing modules 14 in this preferred embodiment are preferably arranged in four groups that are designated as A, B, C, and D. The processing modules 14 are preferably arranged so that as the items P are moved along a processing direction 16, the items P encounter one or more of the different types of the processing modules 14. For example, the items P first pass through processing module A, then two processing modules B, then one processing module D, then one processing module C, and then one processing module D.

If the modular processing device 10 has a sufficiently large width such that more than one processing module 14 is needed to extend across the width of the modular processing device 10, then each of the processing modules 14 that extend across a given width are preferably the same type of processing module 14. For example, two processing modules C are placed adjacent to each other to extend across the width of the modular processing device 10.

The modular processing device 10 preferably includes a conveyor 20 or other similar device for conveying the items P through the modular processing device 10. In such a configuration, the modular processing device 10 preferably has an entry region 22 where the items P are placed onto the conveyor 20 prior to being passed through the region of the modular processing device 10 with the processing modules 14. The modular processing device 10 also preferably has an exit region 24 where the items P that have exited from the region of the modular processing device 10 with the processing modules 14 can be retrieved.

The enclosure 12 preferably substantially encloses the region of the modular processing device 10 where the processing modules 14 are located. The enclosure 12 thereby enhances the efficiency of the processing operation and also prevents operators from accidentally contacting potentially hazardous areas of the processing modules 14.

The enclosure 12 also preferably has insulation that at least partially covers an inner surface or an outer surface thereof to enhance the efficiency of the processing operation and reduce the potential for operators from suffering injuries from contacting the enclosure 12.

The enclosure 12 has an entry port 30 that is located between the entry region 22 and the processing modules 14. The enclosure 12 also has an exit port 32 that is located between the exit region 24 and the processing modules 14. Depending on the type of processing modules 14 used in the modular processing apparatus, the entry port 30 and/or the exit port 32 may have a door 34 that at least partially closes the entry port 30 and/or the exit port 32. For example, the door 34 can prevent radiation associated with microwave heating elements from escaping from the enclosure 12.

In the entry region 22 proximate the entry port 30, the modular processing device 10 preferably includes a sensor 40 that senses the type of item P that is being fed into the modular processing device 10. In a first configuration, the sensor 40 reads a unique indicia 42 that is imprinted on the item P being fed into the modular processing device 10. Examples of suitable indicia are bar codes, portable data files or the like. A person of ordinary skill in the art will appreciate that a variety of different technologies are suitable for use in sensing the size or indicia associated with the item P. In an alternative configuration, the senor 40 measures a size of the item P and then operably controls the operation of the processing modules 14 based upon the measured width.

The moeular processing device 10 has a control system 50 that receives input from the sensor 40. Based on this input, the control system 50 operably adjusts the modules controllers 52, 54. The control system 50 also preferably controls the rate at which the conveyor system 20 operates. The conveyor system can be operated in a continuous motion, or a stop/start motion.

To further enhance the ability to process individual items P, sensors 56 can be included to monitor the surface conditions at selected locations in the modular processing device 10. The sensors 56 thereby enable the operating parameters of the modular processing device 10 to be varied based upon the actual performance results of the modular processing device 10 when used with actual items P.

Each module is controlled, as denoted at, e.g., A', B', C', to a specific environment, e.g., at one or more specific times, by computer controller 50, enabling an item P to be thermally treated or reactively acted upon. Sensor 40 and/or sensor 56 read and identify item P and feed information to computer controller 50 for appropriate control of modules A, B, C, D.

In operation, the item P, such as a pizza, is prepared and placed into a pan that has indicia that identifies characteristics associated with the item P such as the size and food components placed thereon. Alternatively, the item P may itself have identifying indicia. The item P is then placed on the conveyor 20 in the entry region 22.

The conveyor 20 moves the item P towards the entry port 30 where the item P at least partially passes under the sensor 40 where the sensor 40 reads the indicia. This information is transmitted to the control system 50. Based upon the indicia, the control system 50 sets parameters associated with the various processing modules 14. The control system 50 also sets the operational parameters of the conveyor.

As additional examples, food items or other items P need not move through the oven or other environmental chamber continuously. Start-stop motion is contemplated, as is temporary or permanent stationary treatment (e.g., baking, cooking, cooling, irradiation or other treatment), optionally as controlled by controller 50 or other control device.

Embodiments of the invention allow multiple types of items, and multiple sizes of items (e.g., large, medium and small pizzas of different ingredients, consistencies, thicknesses, weights, and other characteristics), requiring or benefiting from substantially different treatment protocols (e.g., baking temperatures, times and/or methods) to be treated in a single treatment device (e.g., a modular oven having removable and replaceable treatment modules).

Embodiments of the invention can greatly reduce equipment, labor, operational and other costs for, e.g., a restaurant or other treatment facility in which the invention is used. Other variations and other advantages will be apparent to those of ordinary skill.

Figure 3:
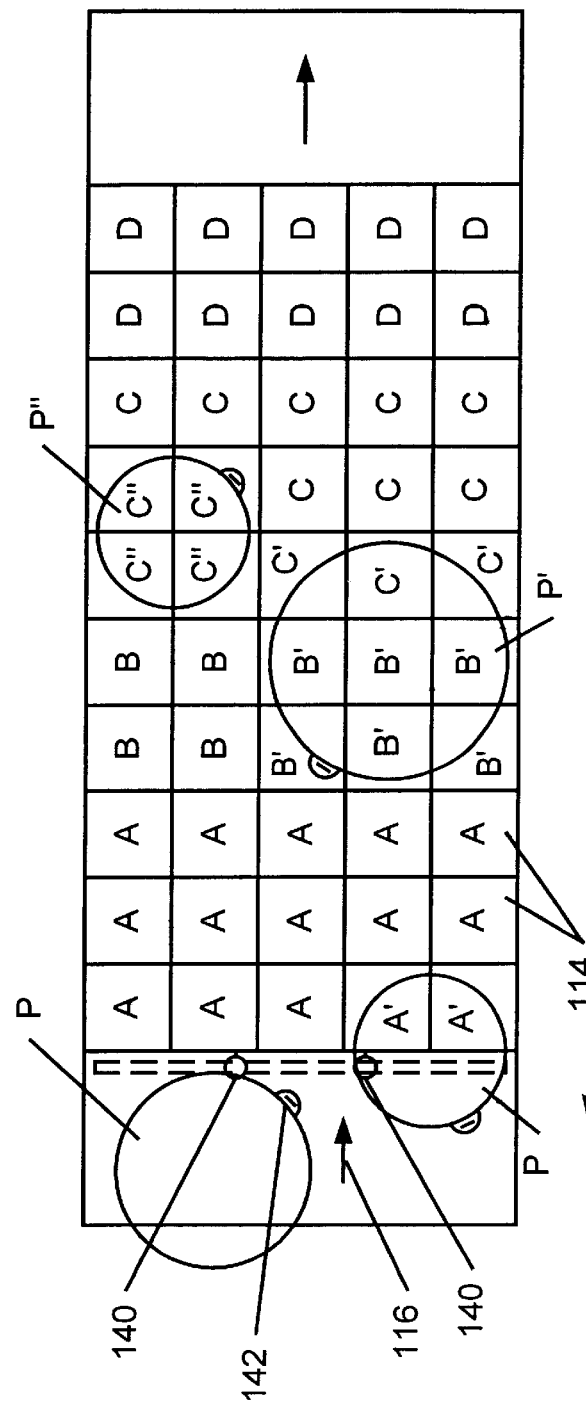
FIG. 3 is a top view of an oven or other environmental device according to another embodiment of the present invention.

In an alternative embodiment, the modular processing device 110 includes a series of five processing modules 114 that extend across a width of the modular processing device, as most clearly illustrated in FIG. 3. Similar to the embodiment illustrated in FIGS. 1 and 2, the modular processing device 110 has an array of processing modules 114 where the processing modules 114 are aligned along a processing direction 116, with the modules 114 having a variety of processing characteristics. The processing modules 114 aligned perpendicular to the processing direction 116 preferably have the same processing characteristics.

This embodiment of the modular processing device 110 permits multiple items P to be simultaneously processed across a width of the modular processing device 110. For example, when the indicia associated with a small item P" sensed by the sensors 140, the processing modules 114 are sequentially adjusted so that conditions needed to optimally process small item P" are provided as the small item P" passes through the modular processing device 110, such as is illustrated by C". Similarly, when indicia associated with a large item P" is sensed by the sensors 140, the processing modules 114 are sequentially adjusted so that conditions needed to optimally process the large item P' are provided as the large item P' passes through the modular processing device 110, such as is illustrated by B' and C'.

The modular processing device 110 of the present invention thereby enhances the efficiency of the process technique because only the processing modules 114 needed at a particular point are activated. This process thereby allows unneeded processing modules 114 to be turned off.

Figure 4:
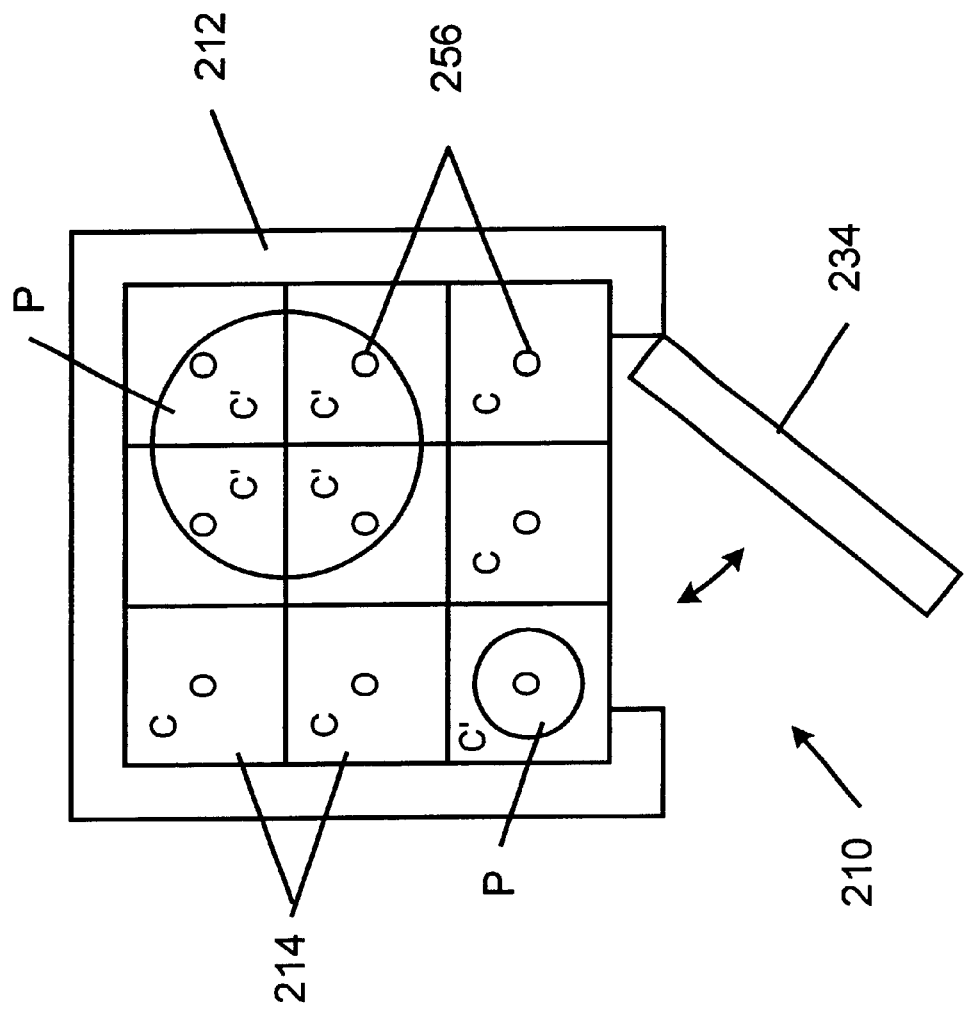
FIG. 4 is a top view of an oven or other environmental device according to yet another embodiment of the present invention.

In yet another embodiment, the modular processing device 210 has a stationary operation mode, as most clearly illustrated in FIG. 4. Similar to the embodiments illustrated in FIGS. 1–3, the modular processing device 210 includes a plurality of processing modules 214 that are arranged in an array within an enclosure 212.

In this embodiment, all of the processing modules 214 preferably have the same mode of operation. Each of the processing modules 214 used in this embodiment have a sensor 256 that monitors the surface conditions proximate that processing modules 214 and report the monitored conditions to a control system (not shown) so that the processing conditions may be adjusted to produce optimal processing results.

The modular processing device 210 has a single door 234 that is pivotally mounted to the enclosure 212 for movement between open and closed positions for placing items into and removing items from the modular processing device 210. The door 234 is preferably closed during the processing operation to enhance the efficiency of the processing operation and reduce the potential for operators suffering injuries associated with contact with or transmission from the processing modules 214 during the processing operation.

While the present invention has been described and illustrated with reference to particular embodiments, the invention is not limited to the specific features and examples given. For example, baking, freezing or drying or other treatment of products other than pizzas or food items, such as drying paper, may benefit from the devices and methods disclosed herein. Additionally, combinations of the specified embodiments of the invention may be utilized to increase the advantages of the particular embodiments in any appropriate manner.

More specifically, the embodiments shown and described with respect to any one figure can be used with and/or combined with the embodiments of any one or more additional figures. Various other modifications to the invention will occur to those of ordinary skill in the art, and other embodiments and modifications can be made by those skilled in the art without departing from the spirit and scope of the invention.

What is claimed is:

1. A multi-technology oven for processing items, the multi-technology oven comprising a plurality of processing modules mounted therein, wherein the plurality of processing modules are removably mounted in the multi-technology oven, and wherein the plurality of processing modules are independently operable to create an independent processing condition for each item and to process multiple items simultaneously within the oven, each of the multiple items requiring a different processing condition for optimal processing.

2. The multi-technology oven of claim 1, wherein the multi-technology oven has an enclosure with an entry port and an exit port.

3. The multi-technology oven of claim 2, and further comprising a sensor mounted proximate the entry port, wherein the sensor is capable of sensing a characteristic associated with an item and controlling the operation of the processing modules based upon the sensed characteristic.

4. The multi-technology oven of claim 2, and further comprising a conveyor for conveying the items through the enclosure from the entry port to the exit port, the processing modules being sequentially adjusted such that the independent processing condition for each item moves through the enclosure as each item is conveyed through the enclosure.

5. The multi-technology oven of claim 1, and further comprising at least one sensor mounted proximate to at least one of the plurality of processing modules to sense characteristics associated with the performance of the processing modules.

6. The multi-technology oven of claim 1, wherein each of the processing modules in the plurality of processing modules is arranged in an array.

7. The multi-technology oven of claim 6, wherein processing modules located at different locations in the multi-technology oven have different processing characteristics.

8. The multi-technology oven of claim 1, wherein the processing modules use one or more of the following techniques: air or gas impingement, heat or cold treatment, electronic dielectric heating, microwave, radio wave, ultrasonic wave, light wave, conductive heat, radiant heat, convective heat, cold plate and/or other heating and/or cooling technologies.

9. A processing system comprising:
a plurality of items to be processed, wherein each of the items have an identifying indicia;
a processing device having an entry port;
a plurality of processing modules removably mounted in the processing device;
a sensor mounted proximate the entry port to sense the identifying indicia; and
a control system operably connected to the plurality of processing modules and the sensor, wherein the control system operably adjusts each of the modules in the plurality of processing modules in response to the sensed identifying indicia;
wherein the processing device defines a length and a width, further wherein at least two processing modules are disposed across the length of the processing device and at least two processing modules are disposed across the width of the processing device.

10. The processing system of claim 9, and further comprising an exit port and a conveyor for conveying the items from the entry port to the exit port.

11. The processing system of claim 9, and further comprising at least one sensor mounted proximate to at least one of the plurality of processing modules to sense characteristics associated with the performance of the processing modules.

12. The processing system of claim 9, wherein each of the processing modules in the plurality of processing modules is arranged in an array.

13. The processing system of claim 12, wherein processing modules located at different locations in the multi-technology oven have different processing characteristics.

14. The processing system of claim 9, wherein the processing modules use one or more of the following techniques: air or gas impingement, heat or cold treatment, electronic dielectric heating, microwave, radio wave, ultrasonic wave, light wave, conductive heat, radiant heat, convective heat, cold plate and/or other heating and/or cooling technologies.

15. A method of processing items, the method comprising:
providing a processing device having an entry port and an exit port;
removably mounting a plurality of processing modules in the processing device;
moving the items through the processing device from the entry port to the exit port;
individually controlling the operation of the plurality of processing modules at selected locations to create an individualized processing condition for each item, such that each item exhibits optimal results from the processing; and moving the individualized processing condition for each item through the processing device as each item moves through the processing device, such that multiple items requiring different individualized processing conditions can be treated simultaneously and independently in the processing device.

16. The method of claim 15, and further comprising sensing a characteristic associated with the item, and controlling the operation of the plurality of processing modules based upon the sensed characteristic.

17. The method of claim 16, wherein sensing a characteristic associated with the item comprises reading an indicia on the item.

18. The method of claim 16, wherein sensing a characteristic associated with the item comprises sensing response of the item to the processing by each of the processing modules.

19. The method of claim 15, wherein moving the items through the processing device is performed by a conveyor.

20. The method of claim 19, further comprising adjusting a rate at which the item is moved with the conveyor based upon a characteristic of the item.

21. The method of claim 15, wherein the processing modules use one or more of the following techniques: air or gas impingement, heat or cold treatment, electronic dielectric heating, microwave, radio wave, ultrasonic wave, light wave, conductive heat, radiant heat, convective heat, cold plate and/or other heating and/or cooling technologies.

22. The method of claim 15, wherein the items move through the processing device in a processing direction, the method further comprising:
   providing a plurality of processing modules across a width of the processing device in a direction perpendicular to the processing direction; and
   processing multiple items simultaneously across the width of the processing device using said processing modules provided across the width of the processing device.

23. The method of claim 22, further comprising sensing a width of each item and controlling operation of processing modules based on the width.

24. The method of claim 15, further comprising removing a processing module from the processing device and replacing the removed processing module with another processing module while the modular processing device is at least partially activated.

25. The method of claim 15, wherein the items are pizzas.

26. A method of baking multiple food items, the method comprising:
   providing an oven for receiving the food items;
   providing multiple baking modules along a length of the oven;
   placing multiple food items into the oven;
   moving the multiple food items along the length of the oven;
   controlling the multiple baking modules independently to create individualized and independent baking conditions for each food item according to different baking protocols;
   moving the individualized and independent baking conditions along the length of the oven as the items move along the length of the oven, to bake the food items simultaneously according to their different respective baking protocols.

27. The method of claim 26, further comprising providing multiple baking modules across a width of the oven, and controlling the multiple baking modules independently across the width of the oven to create an individualized and independent baking condition for each food item.

28. The method of claim 27, further comprising sensing a width of each food item for use in creating the individualized and independent baking condition for each food item.

* * * * *